Nov. 23, 1926.

F. S. BOWSER 1,607,941

SUCKER ROD COUPLING GUIDE

Filed May 2, 1925

Inventor
Francis S. Bowser
By Lancaster and Allwine
Attorneys

Patented Nov. 23, 1926.

1,607,941

UNITED STATES PATENT OFFICE.

FRANCIS S. BOWSER, OF EL DORADO, ARKANSAS.

SUCKER-ROD-COUPLING GUIDE.

Application filed May 2, 1925. Serial No. 27,613.

This invention relates to improvements in sucker rod joints.

The primary object of this invention is the provision of an improved guide sleeve for sucker rod strings, which is attached in novel manner thereto, and the function of which is to concentrate wear thereon incident to reciprocation of the sucker rod in the tube.

A further object of this invention is the provision of a novel type of sucker rod joint, embodying a sleeve-like guide member which is screw-threaded in a novel relation upon the sucker rod coupling, and which at its external periphery is of a diameter or width greater than any other part of the sucker rod which reciprocates within the well tube, so that wear will be concentrated upon this guide member, incident to contact with the inside of the tube.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved sucker rod coupling or joint, and including the improved guide member, showing the same relatively positioned within the well tubing.

Figure 1:
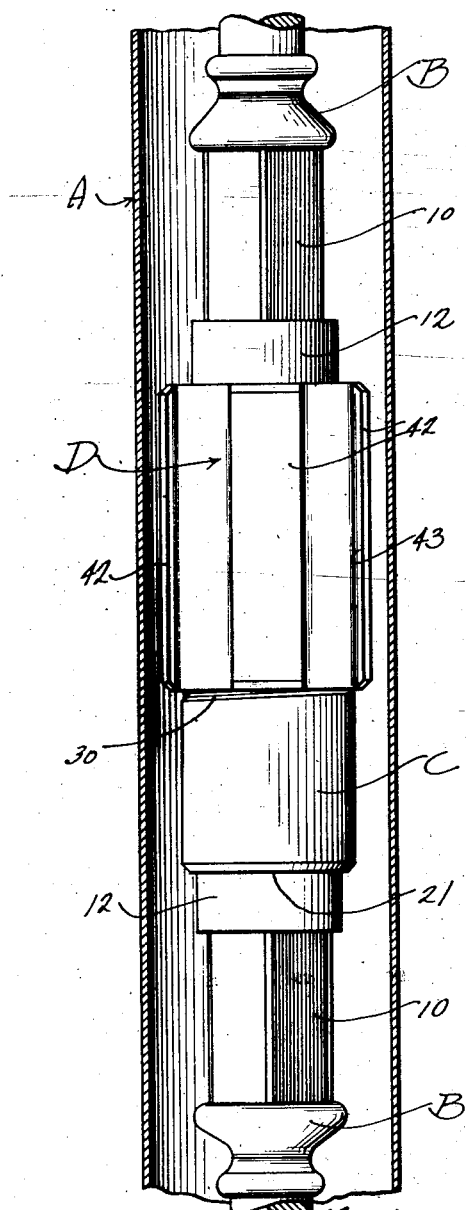

In the drawing, wherein for the purpose of illustration is shown only a preferred embodiment of this invention, the letter A may generally designate well tubing of any approved character, within which the sucker rod line is reciprocably disposed, and which comprises a plurality of sucker rod sections B, connected by a coupling C over which the improved guide member or sleeve D is positioned, in a novel relation, to prevent its accidental detachment, and to operate efficiently in buffing the frictional action incident to rod reciprocation in the tube A.

The sucker rods B are of the conventional construction, each including the polygonal shaped wrench engaging portion 10, and at the outer end thereof supporting the reduced screw threaded shank 11, which at the juncture of the same with the portion 10 has an annular coupling abutting shoulder 12, as in well known construction.

Figure 2:
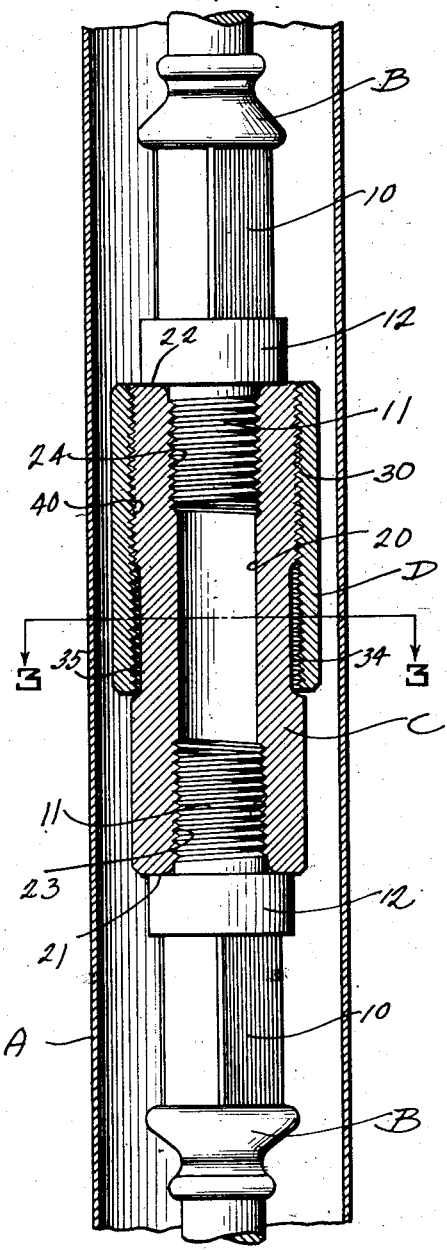
Figure 2 is a sectional view taken longitudinally through the sucker rod joint structure.
Figure 3:
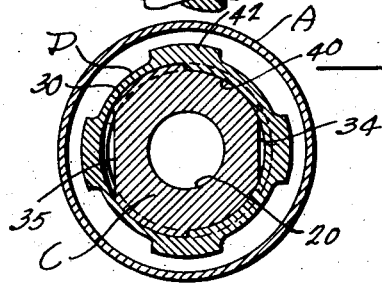
Figure 3 is a transverse sectional view taken substantially on the line 3—3 of Figure 2, and showing more particularly the relation of the guide sleeve to the coupling at the sucker rod joint.

The coupling sleeve or member C is preferably tubular in formation, having the passageway 20 which is threaded inwardly of the opposite end edges 21 and 22 thereof, as at 23 and 24; this threading preferably not extending the entire length of the passageway 20, but only inwardly a short distance from the end edges of the said coupling sleeve, to detachably accommodate the screw threaded shanks 11 of lower and upper rod sections B, substantially in the relation illustrated in Figure 2 of the drawing. As a novel feature of the coupling member C, the same is externally screw threaded at 30, inwardly from the top edge 22 thereof, and continuing for approximately three-quarters of the length of the said sleeve, so that said threading terminating short of the lower end edge of the coupling member. At diametrically opposed sides of the coupling sleeve C, the same is provided with flattened wrench engaging surfaces 34 and 35, which extend across the threads 30, only at the lower end of the threading 30, approximately midway between the ends of the coupling sleeve C, and as is well illustrated in Figures 2 and 3 of the drawings.

Referring to the guide and wear receiving member D, the same is preferably of sleeve-like formation, and made up of any approved alloy metal, which is softer than the tubing A, so that wear will be concentrated on the member D, and permit the efficient operation of the sucker rod string. The alloy of which the same is made is preferably bronze, brass, lead, and copper, of any approved proportion, although other alloys or metals may be used, it being the purpose of the invention to provide a guide and wear receiving member D which is softer than the tubing A. This member D is preferably internally screw threaded at 40, from end edge to end edge thereof, and is adapted for detachable threading upon the threaded upper end 30 of the coupling sleeve C. At its external periphery the said guide member or wear receiving sleeve D is provided with a plurality of spaced longitudinally extending ribs 42, which provide channels 43, so to speak, along which the oil may be pumped, should the ribs be in abutment with the inside surface of the tubing A, at any time.

The advantages of using a sleeve or guide member D in the relation to the coupling member C, as is shown in the drawings and above described, will be apparent to those skilled in the art to which this invention relates, since thereby the sleeve D will be prevented from falling off the coupling sleeve C. The threads 30 terminate short of the lower end of the coupling sleeve C, to provide a binding edge or shoulder against which the sleeve D binds, when the same is fully screwed onto the coupling C, and hence there is absolutely no liability of the downward unthreading of the guide member D so as to permit its falling into the well. On the other hand, should the same become unthreaded upwardly of the coupling member C, by gravity the same will still rest substantially in the relation shown, to receive wear incident to its abutment in sliding relation against the well tubing. The threaded connection of the wear receiving sleeve and the coupling sleeve is an important departure from expedients which have heretofore been resorted to, for effecting this connection, and incident to this screw threaded connection the sleeve D will be absolutely connected to the coupling C, and cannot break away therefrom. I am of course aware that sleeves of this nature have been connected by flanges and like expedients to the couplings, but these flanges are well known to be practically useless, since they easily break off and the result is that the guide or wear receiving sleeve drops to the bottom of the sucker rod string, and in which position it is of course useless. On the other hand, with the use of my improved guide and wear receiving member D, in the novel connection shown, the same is absolutely prevented from any falling into the well, father downwardly along the sucker rod string than the coupling to which it is normally attached. Therefore, the advantage of such connection is obvious.

Various changes in the shape, size, and arrangement of parts may be made to the form of invention herein shown and described, without departing from the spirit of the invention or the scope of the claims.

I claim:

1. In combination with a sucker rod line, a coupling having a portion thereof provided with screw threads terminating abruptly short of the lower end to provide a shoulder, and a wear receiving sleeve-like member internally screw threaded from end to end adapted for detachable connection on said screw threaded portion to a binding position with said shoulder.

2. In combination with a pair of sucker rod sections, a coupling arrangement for said sucker rod sections including a sleeve-like portion having external screw threads from the upper end thereof and terminating short of the lower end thereof to provide an upwardly facing edge where said threads terminate, and a guide member of sleeve-like arrangement having a passageway therethrough internally screw threaded for detachable connection from the upper end of the screw threaded portion of said coupling sleeve-like portion and adapted to bind against said upwardly facing edge.

3. In a sucker rod coupling the combination of a coupling sleeve having internally screw threaded sockets inwardly at the opposite ends thereof, said sleeve externally thereof and from the upper edge thereof having screw threads which terminate short of the lower end thereof to provide a binding edge, said coupling sleeve externally thereof substantially midway of the ends having oppositely disposed flat wrench engaging surfaces, and a guide sleeve of soft metal having an internally screw threaded passageway therethrough to be detachably connected on the externally screw threaded portion of the coupling sleeve inwardly from the upper edge of said coupling sleeve and downwardly thereover into binding engagement with said binding edge.

4. In a device of the class described the combination with a pair of sucker rods, joint means connecting the ends of the sucker rods, a wear resisting sleeve having a passageway therethrough, and thread means formed in the passageway of the wear resisting sleeve and exteriorly on the joint means inwardly from the upper end thereof formed in cooperating relation to provide a binding shoulder which will limit the downward threaded movement of the threaded wear resisting sleeve upon said joint means.

FRANCIS S. BOWSER.